(12) United States Patent
Kim et al.

(10) Patent No.: US 11,477,094 B2
(45) Date of Patent: Oct. 18, 2022

(54) METHOD, APPARATUS, SYSTEM, AND NON-TRANSITORY COMPUTER READABLE MEDIUM FOR PROCESSING HIGHLIGHTED COMMENT IN CONTENT

(71) Applicant: NAVER Corporation, Seongnam-si (KR)

(72) Inventors: Hyun-Soo Kim, Seongnam-si (KR); Bo-keum Choi, Seongnam-si (KR); Yearim Cho, Seongnam-si (KR); Sun Ju, Seongnam-si (KR)

(73) Assignee: NAVER CORPORATION, Gyeonggi-DO (KR)

( * ) Notice: Subject to any disclaimer, the term of this patent is extended or adjusted under 35 U.S.C. 154(b) by 0 days.

(21) Appl. No.: 16/039,433

(22) Filed: Jul. 19, 2018

(65) Prior Publication Data
US 2019/0028362 A1 Jan. 24, 2019

(30) Foreign Application Priority Data
Jul. 19, 2017 (KR) .......................... 10-2017-0091341

(51) Int. Cl.
*H04L 41/22* (2022.01)
*H04W 4/14* (2009.01)
(Continued)

(52) U.S. Cl.
CPC .......... *H04L 41/22* (2013.01); *G06F 3/04883* (2013.01); *G06F 40/169* (2020.01);
(Continued)

(58) Field of Classification Search
CPC ......... H04L 41/22; H04L 51/04; H04L 51/10; H04L 51/32; G06F 3/04842; G06F 40/169; G06F 3/0485; H04W 4/14
See application file for complete search history.

(56) References Cited

U.S. PATENT DOCUMENTS 9,501,758 B2 11/2016 Roberts et al.
10,095,390 B1 10/2018 Lewis et al.
(Continued)

FOREIGN PATENT DOCUMENTS

JP 2008-003973 A 1/2008
JP 2008-278088 A 11/2008
(Continued)

OTHER PUBLICATIONS

Google. (May 27, 2010). Tips & Tricks: Comments in Google documents. Google Drive Blog. https://drive.googleblog.com/2010/05/tips-tricks-comments-in-google-documents.html) is applied to updated rejections (Year: 2010).*
(Continued)

*Primary Examiner* — Matthew Ell
*Assistant Examiner* — David Tan
(74) *Attorney, Agent, or Firm* — Harness, Dickey & Pierce, P.L.C.

(57) ABSTRACT

A comment processing method may include specifying a desired section in content that includes at least one of a text and an image in response to a selection of a user, and registering a comment input from the user to the specified section; and highlighting the section to which the comment is registered in the content, and displaying at least one comment among comments registered to the highlighted section at a point in time at which the highlighted section is displayed on a screen area.

18 Claims, 13 Drawing Sheets

(51) Int. Cl.
*H04L 51/10* (2022.01)
*G06F 3/04883* (2022.01)
*H04L 51/04* (2022.01)
*G06F 40/169* (2020.01)
*G06F 3/0485* (2022.01)
*G06F 3/04842* (2022.01)
*H04L 51/52* (2022.01)

(52) U.S. Cl.
CPC .............. *H04L 51/04* (2013.01); *H04L 51/10* (2013.01); *H04W 4/14* (2013.01); *G06F 3/0485* (2013.01); *G06F 3/04842* (2013.01); *H04L 51/52* (2022.05)

(56) References Cited

U.S. PATENT DOCUMENTS

| | | |
|---|---|---|
| 2005/0160113 A1 | 7/2005 | Sipusic et al. |
| 2006/0053364 A1* | 3/2006 | Hollander .............. G06F 40/169 715/232 |
| 2009/0164484 A1 | 6/2009 | Horowitz et al. |
| 2009/0199098 A1 | 8/2009 | Kweon et al. |
| 2010/0122309 A1 | 5/2010 | Kawakami et al. |
| 2010/0241968 A1* | 9/2010 | Tarara ................... G06F 3/0481 715/751 |
| 2011/0119694 A1 | 5/2011 | Roberts et al. |
| 2011/0246463 A1 | 10/2011 | Carson, Jr. et al. |
| 2013/0004138 A1 | 1/2013 | Kilar et al. |
| 2013/0041956 A1* | 2/2013 | Davenport .............. H04L 51/04 709/206 |
| 2013/0069976 A1* | 3/2013 | Lee ....................... G06F 3/0485 345/619 |
| 2013/0073673 A1 | 3/2013 | McMahon et al. |
| 2013/0097481 A1* | 4/2013 | Kotler ................. G06F 3/04842 715/230 |
| 2014/0002736 A1 | 1/2014 | Kaushal et al. |
| 2014/0013200 A1 | 1/2014 | White |
| 2014/0068433 A1 | 3/2014 | Chitturi |
| 2014/0137144 A1 | 5/2014 | Jarvenpaa et al. |
| 2014/0196082 A1 | 7/2014 | Maruyama et al. |
| 2014/0199046 A1 | 7/2014 | Lindsey et al. |
| 2014/0325557 A1 | 10/2014 | Evans et al. |
| 2015/0261853 A1* | 9/2015 | Shao ................... G06F 16/9577 707/722 |
| 2015/0346955 A1 | 12/2015 | Fundament et al. |
| 2016/0063117 A1* | 3/2016 | Carter ............... G06F 16/24522 707/727 |
| 2016/0219338 A1 | 7/2016 | Wang et al. |
| 2016/0277328 A1 | 9/2016 | Ishizuka |
| 2016/0286244 A1 | 9/2016 | Chang et al. |
| 2017/0142047 A1* | 5/2017 | Mendiola ................ H04L 51/10 |
| 2017/0229152 A1 | 8/2017 | Loganathan et al. |
| 2017/0257410 A1 | 9/2017 | Gattis et al. |
| 2017/0289619 A1 | 10/2017 | Xu et al. |
| 2018/0191660 A1 | 7/2018 | Tene et al. |
| 2018/0329582 A1* | 11/2018 | Clediere .............. G06Q 10/107 |
| 2018/0337880 A1 | 11/2018 | Sokolov et al. |

FOREIGN PATENT DOCUMENTS

| | | |
|---|---|---|
| JP | 2013-003685 A | 1/2013 |
| JP | 2014-010677 A | 1/2014 |
| JP | 2014-11597 A | 1/2014 |
| JP | 2015-005940 A | 1/2015 |
| JP | 2015-513134 A | 4/2015 |
| JP | 2017-16294 A | 1/2017 |
| JP | 2017-016535 A | 1/2017 |
| JP | 2017-027144 A | 2/2017 |
| JP | 6195687 B1 | 9/2017 |
| KR | 10-2006-0057079 A | 5/2006 |
| KR | 10-2013-0029579 A | 3/2013 |
| KR | 10-2014-0080608 | 7/2014 |
| KR | 10-2014-0080608 A | 7/2014 |
| KR | 10-2014-0125361 A | 10/2014 |
| KR | 10-2014-0140202 A | 12/2014 |
| KR | 10-1665579 | 10/2016 |
| KR | 10-2017-0029933 | 3/2017 |
| WO | WO-2014/013689 A1 | 1/2014 |
| WO | WO-2017/010720 A1 | 1/2017 |

OTHER PUBLICATIONS

U.S. Office Action dated Oct. 2, 2019 for co-pending U.S. Appl. No. 16/122,053.

Japanese Office Action dated Dec. 3, 2019 for corresponding Japanese Application No. 2018-160083.

U.S. Office Action dated May 28, 2020 for co-pending U.S. Appl. No. 16/122,053.

U.S. Office Action dated Oct. 8, 2020 for co-pending U.S. Appl. No. 16/122,053.

U.S. Office Action dated May 26, 2021 for co-pending U.S. Appl. No. 16/122,053.

Japanese Office Action dated Aug. 13, 2019 for corresponding Japanese Application No. 2018-160063.

Kazuho Yamada et al., "A Proposal of Audience-Communications Using Video Structures," Information Processing Society of Japan, vol. 2202, No. 31 pp. 37-42, Mar. 23, 2002.

Japanese Office Action dated Jul. 2, 2019 for corresponding Japanese Application No. 2018-134856.

U.S. Office Action dated Sep. 8, 2021 for co-pending U.S. Appl. No. 16/122,053.

U.S. Notice of Allowance dated Mar. 22, 2022 for corresponding U.S. Appl. No. 16/122,053.

U.S. Office Action dated Feb. 4, 2020 for corresponding U.S. Appl. No. 16/122,053.

* cited by examiner

222

METHOD, APPARATUS, SYSTEM, AND NON-TRANSITORY COMPUTER READABLE MEDIUM FOR PROCESSING HIGHLIGHTED COMMENT IN CONTENT

CROSS-REFERENCE TO RELATED APPLICATION(S)

This U.S. non-provisional application claims the benefit of priority under 35 U.S.C. § 119 to Korean Patent Application No. 10-2017-0091341, filed on Jul. 19, 2017, in the Korean Intellectual Property Office (KIPO), the entire contents of which are incorporated herein by reference.

BACKGROUND

Field

One or more example embodiments relate to a technique for processing comments on content (e.g., online content, multimedia content, etc.).

Description of Related Art

In the current ubiquitous computing environment, a user may access an Internet network and surf the web without restrictions regarding the time and/or the occasion. The Internet is indispensable for many users.

Through the Internet, users may provide information regarding what they know, may acquire a variety of information they need, and may exchange a variety of information while exchanging mutual opinions.

One related web service is a comment service that allows users to access various websites and to provide opinions, information, etc., on and/or regarding a specific article of an accessed website.

Various Internet services including a personal content service, such as a personal homepage, a blog, etc., a social networking service, a portal service, an online media content providing service, a reviewing service, an online shopping service, and other media services, allow users to post comments. Thus, the users may easily share comments on content with other users in a comment form.

For example, conventional technology exists for processing a comment by transmitting the comment to an Internet website using a mobile communication terminal.

However, in the case of a general comment, a user may only post a comment regarding the entire content. Thus, it may be difficult to verify the context regarding which part of the content that attracts users to react and sympathize with.

SUMMARY

One or more example embodiments provide a method, an apparatus, a system, and/or a non-transitory computer readable medium that enables a user to highlight and to post a comment on a portion of online content selected by a user including a text and/or an image.

One or more example embodiments also provide a method, an apparatus, a system, and/or a non-transitory computer readable medium that may provide a highlighted comment based on a portion displayed on a screen area during a content providing process.

According to an aspect of at least one example embodiment, there is provided a computer-implemented comment processing method including receiving, using at least one processor, content from a server, specifying, using the at least one processor, a desired section in the received content in response to a selection of a user, the content including at least one of a text and an image, registering, using the at least one processor, a comment input by the user to the specified desired section of the content with the server, the registering including associating the comment with the desired section of the content on the server, highlighting, using the at least one processor, the desired section to which the comment is registered in the content, and displaying, using the at least one processor, at least one comment among comments registered to the highlighted section at a point in time at which the highlighted section is displayed on a screen area.

The displaying may include displaying the at least one comment in a layer form at a desired location of the screen area.

The displaying may include displaying the at least one comment at a point in time at which the highlighted section is displayed at a reference line of the screen area or a desired area based on the reference line.

The displaying may include distinguishably displaying a portion of the highlighted section that reaches the reference line or the desired area, the portion of the highlighted section being distinguished from a remaining portion of the highlighted section.

The displaying may include displaying an indicator at a location adjacent to a portion of the highlighted section that reaches the reference line or the desired area.

The displaying may include applying a different highlight color for each comment section is registered in the content, and displaying the at least one comment section based on a highlight color of a portion of the highlighted section that reaches the reference line or the desired area.

The registering may include specifying at least one section unit of the content that includes a desired word, the desired word corresponding to a location selected by the user in the content.

The comment processing method may further include transmitting, using the at least one processor, a list of comments registered to a section of the content corresponding to the highlighted section in response to the user selecting the highlighted section or the displayed comment.

The comment processing method may further include transmitting, using the at least one processor, an all-comment list of comments registered to the content in response to scrolling on the content or a user request. The transmitting the all-comment list may include displaying comments registered to a desired partial section in the content to be distinguished from other comments among the comments included in the all-comment list.

The transmitting the all-comment list may include displaying section information associated with each of the comments registered to the desired partial section in the all-comment list.

The displaying may include displaying the at least one comment in response to receiving a comment display request from the user or repeatedly providing the content to the user, instead of displaying the at least one comment at an initial stage of providing the content to the user.

According to an aspect of at least one example embodiment, there is provided a non-transitory computer-readable recording medium storing computer readable instructions that, when executed by at least one processor, cause the at least one processor to receive content from a server, specify a desired section in the received content in response to a selection of a user, the content including at least one of a text and an image, register a comment input by the user to the specified desired section of the content with the server, the registering including associating the comment with the desired section of the content on the server, highlight the desired section to which the comment is registered in the content, and display at least one comment among comments registered to the highlighted section at a point in time at which the highlighted section is displayed on a screen area.

According to an aspect of at least one example embodiment, there is provided a computer-implemented comment processing system including at least one processor configured to execute computer-readable instructions to receive content from a server, specify a desired section in the received content in response to a selection of a user, the content including at least one of a text and an image, register a comment input by the user to the specified desired section of the content with the server, the registering including associating the comment with the desired section of the content on the server, highlight the desired section to which the comment is registered in the content, and display at least one comment among comments registered to the highlighted section at a point in time at which the highlighted section is displayed on a screen area.

According to some example embodiments, a user may post a comment on a portion of the content that the user actually sympathizes with, the content including a text and/or an image. The user may post the comment through highlighting the portion of the comment that the user desires to respond to and/or comment about, and the comment will be processed on the portion of the content that was selected by the user, thereby improving existing Internet commenting systems and/or online commenting systems by allowing users to specify exact portions, subsections, and/or positions of the content that they are commenting about, and allowing for viewers of the content and the posted comments to be able to immediately view both the content and the response to the content at the same time and/or side-by-side, thereby improving and amplifying the effect of the comment. Further, because the commenter may comment directly on the Internet content, the commenter may reach a wider audience regarding his or her comments than is possible using pre-Internet technology.

Also, according to some example embodiments, it is possible to verify content and user comments simultaneously, and to easily verify the context of the comment by providing a highlighted comment based on the portion of the content displayed on a screen area during a content providing process.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
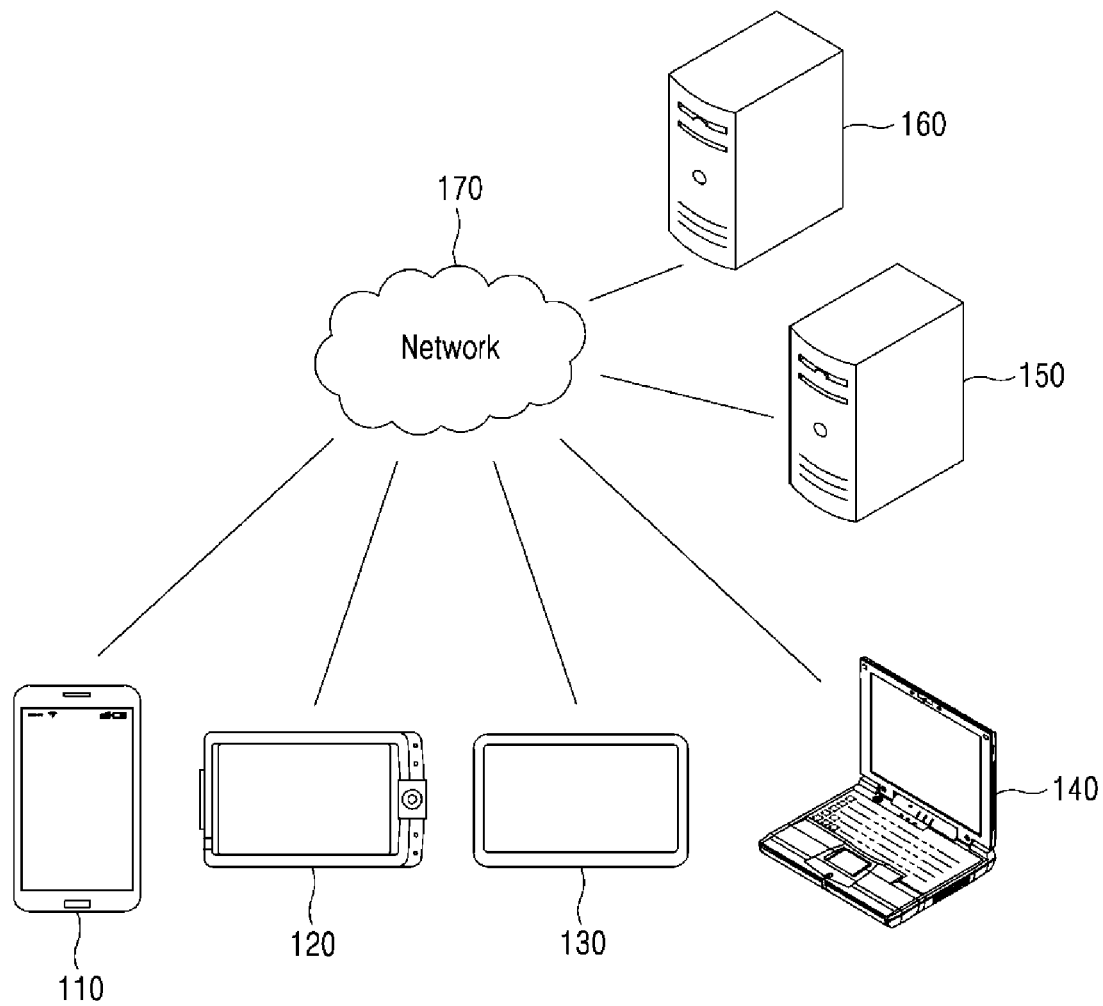
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for processing comments on content (e.g., online content and/or media content, etc.), and more particularly, to a method, apparatus, system, and/or non-transitory computer readable medium that may process a comment on a partial section of the content.

The example embodiments disclosed herein may allow a user to post and provide a comment on a partial section on and/or in the content, and may achieve many advantages in terms of understanding the context of a comment, efficiency, convenience, cost reduction, and the like.

FIG. 1 is a diagram illustrating an example of a network environment according to at least one example embodiment. Referring to FIG. 1, the network environment includes a plurality of electronic devices 110, 120, 130, and 140; a plurality of servers 150 and 160; and a network 170. FIG. 1 is provided as an example only and thus, the number of electronic devices, the number of servers, and/or the number of networks are not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, a tablet personal computer, a personal computer (PC), a gaming console, a personal navigation device, a workstation computer, a laptop computer, a digital broadcasting terminal, a personal digital assistant (PDA), a portable multimedia player (PMP), an Internet of Things (IoT) device, a Virtual Reality (VR) and/or Augmented Reality (AR) device, and the like. For example, the electronic device 110 may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170. For example, the server 160 may provide a file for installing an application to the electronic device 110 connected through the network 170. In this case, the electronic device 110 may install the application using the file provided from the server 160. Also, the electronic device 110 may access the server 150 under control of at least one program, for example, browser or the installed application, or an operating system (OS) included in the electronic device 110, and may use a service or content provided from the server 150. For example, when the electronic device 110 transmits a service request message to the server 150 through the network 170 under control of the application, the server 150 may transmit a code (e.g., software, script, computer readable instructions, etc.) corresponding to the service request message to the electronic device 110 and the electronic device 110 may provide content to a user by configuring and displaying a screen according to the code under control of the application.

Figure 2:
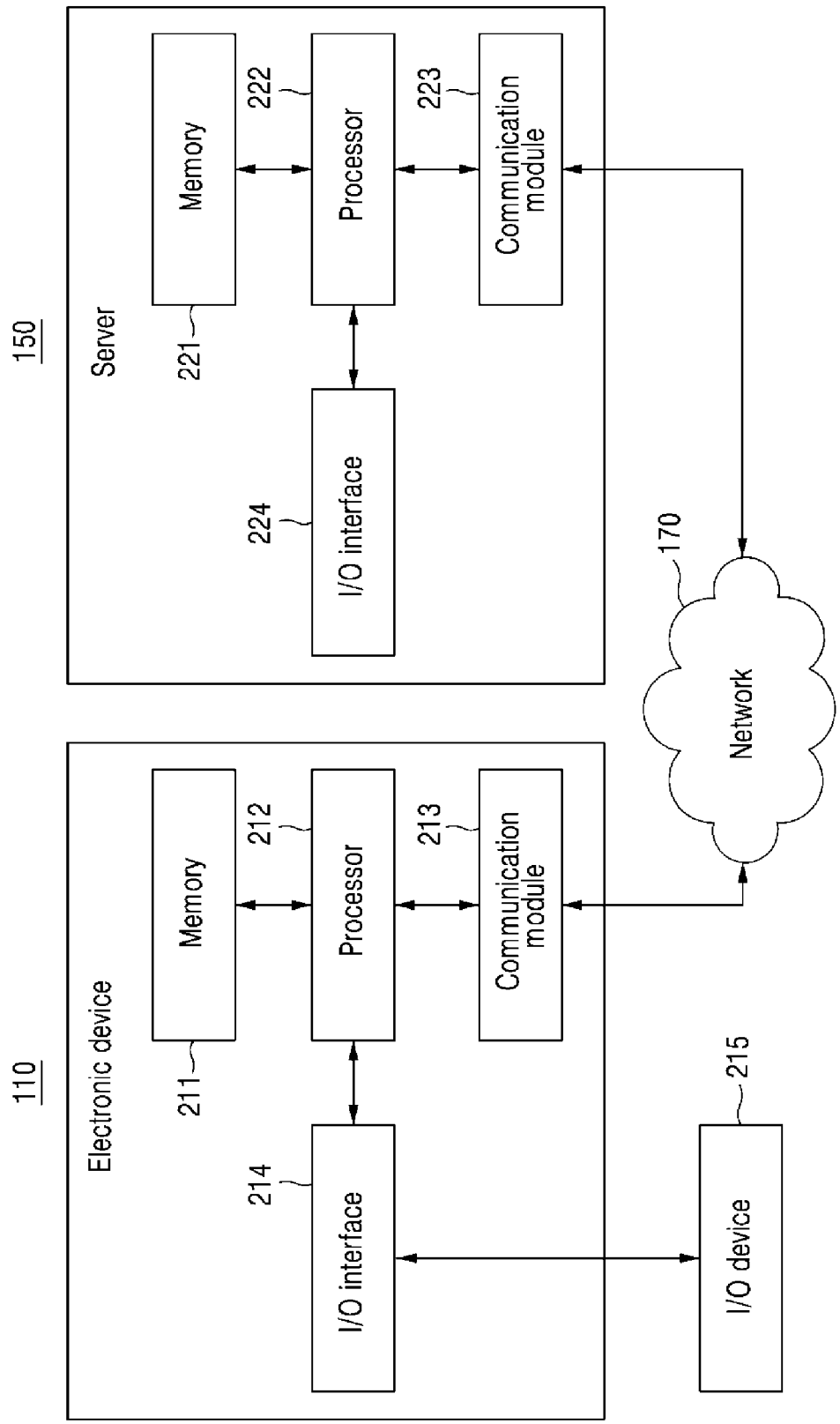
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and/or an input/output (I/O) interface 214, and the server 150 may include a memory 221, at least one processor 222, a communication module 223, and/or an I/O interface 224. However, the example embodiments are not limited thereto, and there may be a greater or lesser number of components included in either the electronic device 110 or the server 150. The memory 211, 221 may include a permanent mass storage device, such as random access memory (RAM), read only memory (ROM), a disk drive, a solid state drive, a flash memory, etc., as a non-transitory computer-readable storage medium. Also, an OS or at least one program code, for example, a code for an exclusive application and/or a browser installed and executed on the electronic device 110, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, for example, a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, a microphone, a camera, a biometric reader, etc., and an output device may include a display device, such as a display for displaying a communication session of the application, a speaker, a haptic feedback device, etc. As another example, the I/O interface 214 may be a device for interface with an apparatus in which an input function and an output function are integrated into a single function, such as a touchscreen. In detail, when processing computer readable instructions of the computer program loaded to the memory 211, the processor 212 of the electronic device 110 may display a service screen configured using data provided from the server 150 or the electronic device 120, or may display content on a display through the I/O interface 214. Likewise, the I/O interface 224 may also output information configured using data provided from the server 150 when the processor 222 of the server 150 processes computer readable instructions of a computer program loaded to the memory 221.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a haptic feedback motor for vibration, etc., which are generally included in the smartphone.

Hereinafter, example embodiments of a method and system that may process a highlighted comment in content.

The term "content" used herein may indicate a document (e.g., a HTML document, a XML document, a user interface for display on an app, etc.) that includes at least one of a text and an image among documents released publicly on the Internet. Additionally, the content may include various types of postings, for example, a news article, an electronic book (E-book), a webtoon, multimedia content (e.g., photos, videos, music, etc.), and the like.

Figure 3:
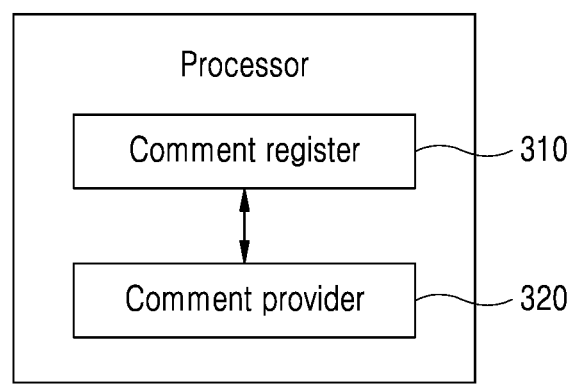
FIG. 3 is a block diagram illustrating an example of components includable in at least one processor of a server according to at least one example embodiment.
Figure 4:
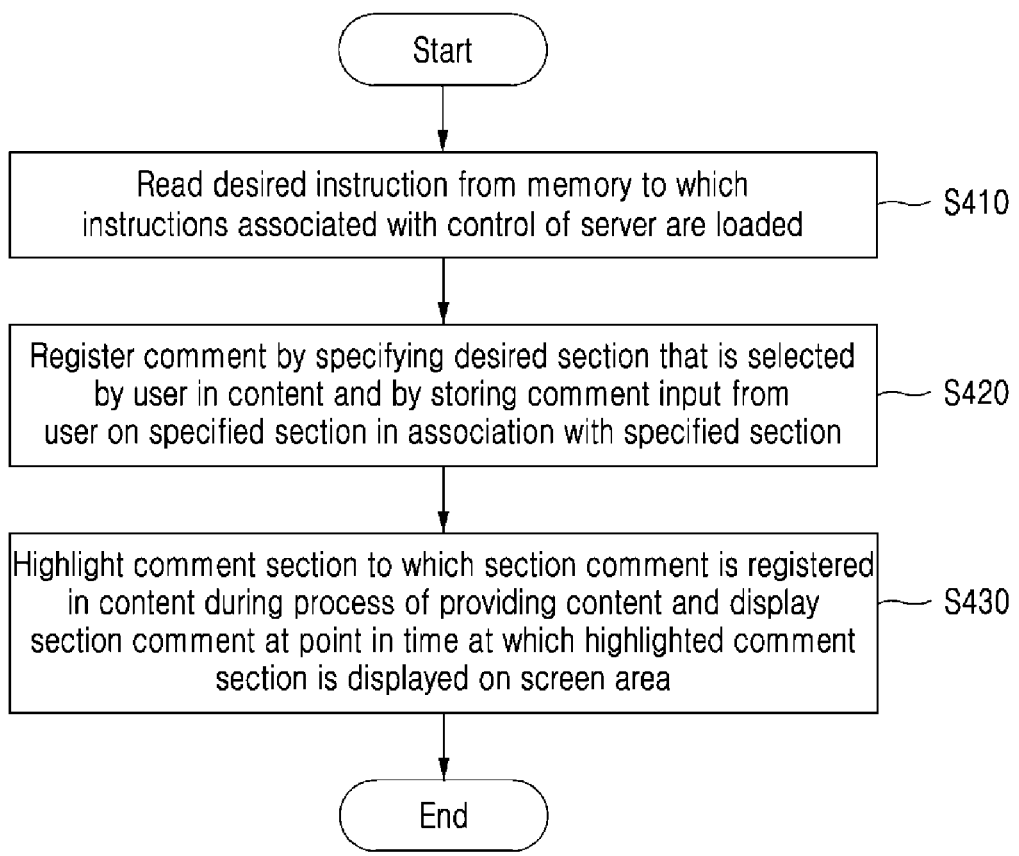
FIG. 4 is a flowchart illustrating an example of a method performed by a server according to at least one example embodiment.

FIG. 3 is a block diagram illustrating an example of components includable in at least one processor of a server according to at least one example embodiment, and FIG. 4 is a flowchart illustrating an example of a method performed by a server according to at least one example embodiment.

The server 150 according to the example embodiment may include a highlighted comment processing system configured as a computer. The server 150 may provide content and at least one comment on, related to, in connection to, and/or regarding the content to the plurality of electronic devices 110, 120, 130, and/or 140 that are clients of the server. Here, the server 150 may provide content corresponding to a service request and a comment on the content through a connection to a dedicated application installed on the electronic devices 110, 120, 130, and/or 140, and/or a website/mobile site associated with the server 150.

Referring to FIG. 3, the at least one processor 222 of the server 150 may include a comment register 310 and a comment provider 320 as components of the processor 222. Depending on example embodiments, the components of the processor 222 may be selectively included in or excluded from the processor 222. Also, the components of the processor 222 may be separate or merged to represent a function of the processor 222.

The processor 222 and the components of the processor 222 may control the server 150 to perform operations S410 through S430 included in the highlighted comment processing method of FIG. 4. For example, the processor 222 and the components of the processor 222 may be configured to execute computer readable instructions according to a code of at least one program and a code of an OS included in the memory 221.

Also, the components of the processor 222 may be representations of different functions performed by the processor 222 in response to one or more computer readable instructions provided by the program code stored in the server 150. For example, the comment register 310 may be used as a functional representation of the processor 222 to control the server 150 to register a comment in response to the computer readable instruction.

Referring to FIG. 4, in operation S410, the processor 222 may read a desired computer readable instruction from the memory 221 to which computer readable instructions associated with control of the server 150 are loaded. In this case, the read instruction may include an instruction for controlling the processor 222 to perform the following operations S420 and S430.

In operation S420, the comment register 310 may register a comment by specifying a desired section in the content being verified (e.g., viewed, consumed, etc.) by a user of an electronic device, for example, the electronic device 110 of FIG. 1, and by storing a comment input by the user on the specified section of the content in association with the desired section of the content stored on the server 150 and provided by the server 150. Additionally, in some example embodiments, the content may be stored and provided by a separate server that is interconnected to the server 150. The user may post an opinion of the user on the content using a comment form user interface (UI) for providing comments related to the content while verifying (e.g., viewing, consuming, etc.) the content. The user may post a comment related to the entire content (hereinafter, referred to as a common comment) and/or may select a partial section of the content and may post a comment (hereinafter, referred to as a section comment) related to the selected section (e.g., the selected partial section) of the content.

In the case of specifying a section (hereinafter, referred to as a comment section) to post a section comment in the content, the user may select an image that the user desires to post a comment on using a user action on the comment form UI, for example, a long tap, a swipe, a drag, another gesture operation, another mouse operation, a keyboard operation, a voice command operation, etc., and may specify the selected image as a comment section.

In the case of a text, the user may specify a comment section by directly selecting a text section (e.g., a portion of the entire text, such as a word, a sentence, a paragraph, etc.) using a section selection gesture, for example, a touch and drag, other tools, etc. As another example, if the user selects a specific location in the content using, for example, a long tap, a section unit, e.g., a syntactic word, a sentence, a paragraph, etc., in which a word corresponding to the selected location is included may be automatically specified as a comment section based on the word.

The common comment or the section comment may be in various formats, for example, a text, a voice (e.g., an audio clip, streaming music, etc.), an image, and a moving picture (e.g., a video, streaming video, GIF, Flash file, SVG file, etc.), a video game, etc., and may also use a sticker and an emoji expressing various emotions as images. In the case of the section comment, the comment register 310 may complete a registration of the section comment by storing information associated with the comment section with the comment input from the user. Here, information associated with the comment section may include a text, an image, a sub-portion of the audio content, a sub-portion of the video content, a sub-portion of the video game, etc., itself corresponding to the comment section, or may include a location value corresponding to the specified content corresponding to the comment section. Accordingly, the user may select a desired section, for example, a text section or an image, etc., in the content and may post a comment on the section.

In operation S430, the comment provider 320 may highlight the comment section to which the section comment is registered in the content during a process of providing the content to the user of the electronic device, for example, the electronic device 110, or a user of a different electronic device, for example, the electronic device 120, and may display the section comment at a point in time at which the highlighted comment section is displayed on a screen area of the electronic device. For example, the comment provider 320 may display the section comment in a layer form, example, a popup screen, at a desired location of the screen area at a point in time at which the comment section is displayed on the screen area. The entire comments on the content including the section comment and the common comment may be displayed at a lower end at which contents of the content end. The section comment may be displayed so that it overlaps an area of a screen, for example, a lower end of the screen at a point in time at which a section that includes the registered comment is displayed on the screen area. Here, if at least two section comments are registered to a single comment section, the comment provider 320 may select at least one representative comment and may display the selected representative comment, but the example embodiments are not limited thereto and in other example embodiments the comment provider 320 may display all of the comments registered to the comment section, some of the comments registered to the comment section, provide a list of the comments registered to the comment section, etc.

In the at least one example embodiment where at least one representative comment is selected and displayed by the comment provider 320, the representative comment may be selected from among comments registered to a corresponding comment section for each comment section, or may be reselected from among a portion of comments that are selected from among the entire comments on the content. The representative comment may be selected based on a number of positive reactions, for example, a number of views, a number of likes, a number of recommendations, from other users, such as a best comment, etc. It is provided as an example only and the representative comment may be selected based on various criteria. In response to the user selecting a highlighted comment section or a layer on which the section comment is displayed using, for example, a single tap, etc., the comment provider 320 may provide all of the section comments registered to the corresponding comment section. In this manner, the comment provider 320 may provide a community between users based on a unit of the comment section that is a portion in the content, instead of using the entire content.

Figure 5:
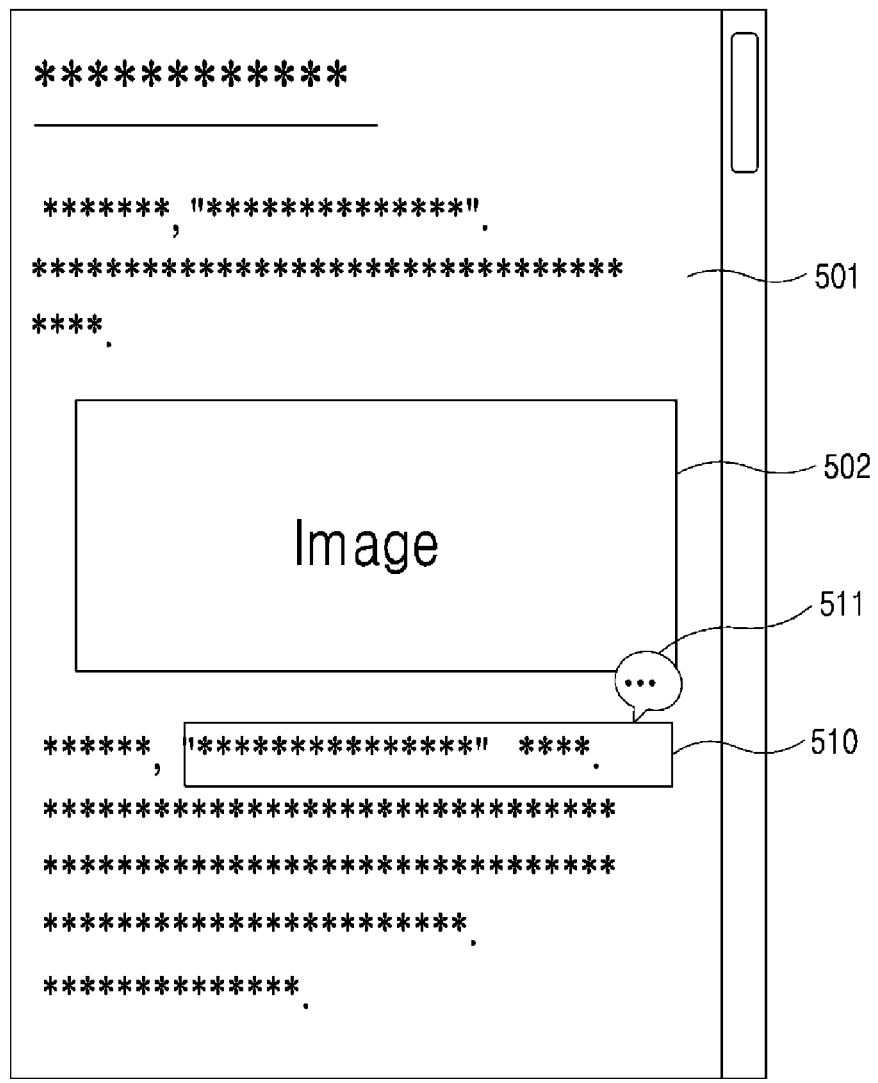
FIGS. 5 through 7 illustrate examples of a method of registering a section comment according to at least one example embodiment.
Figure 6:
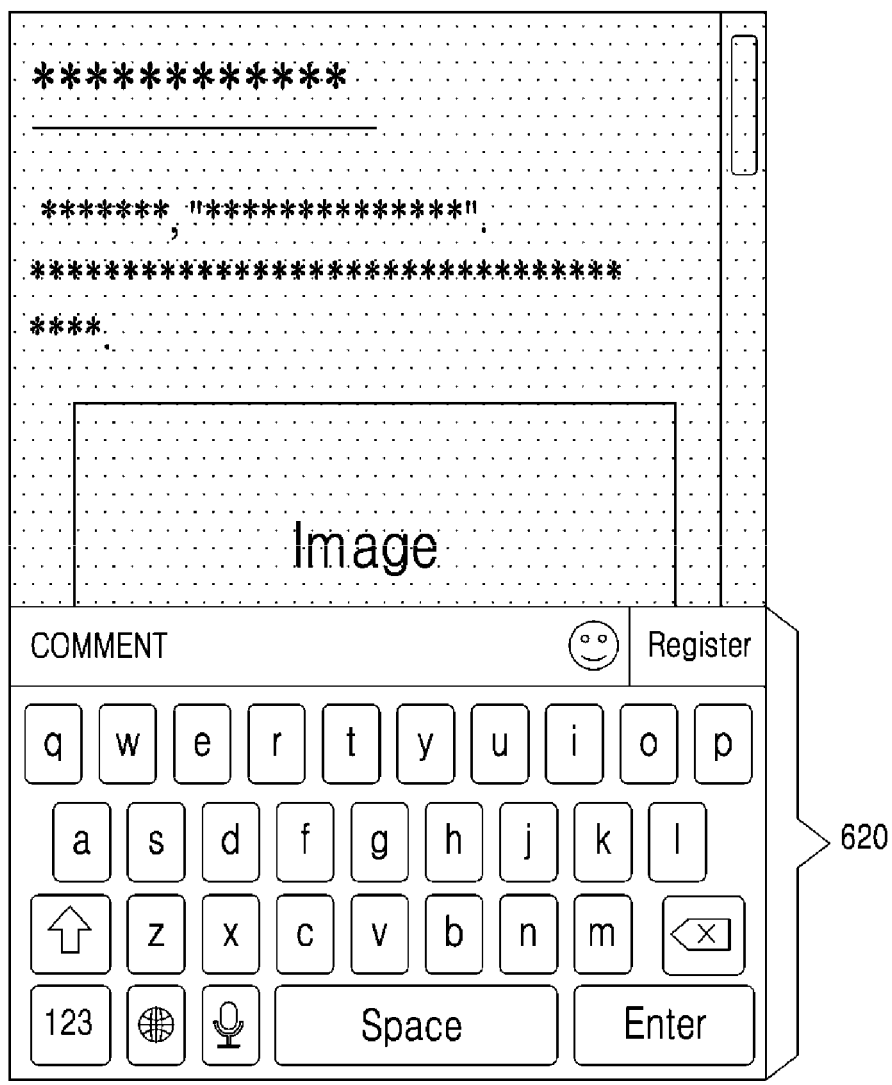
Figure 7:
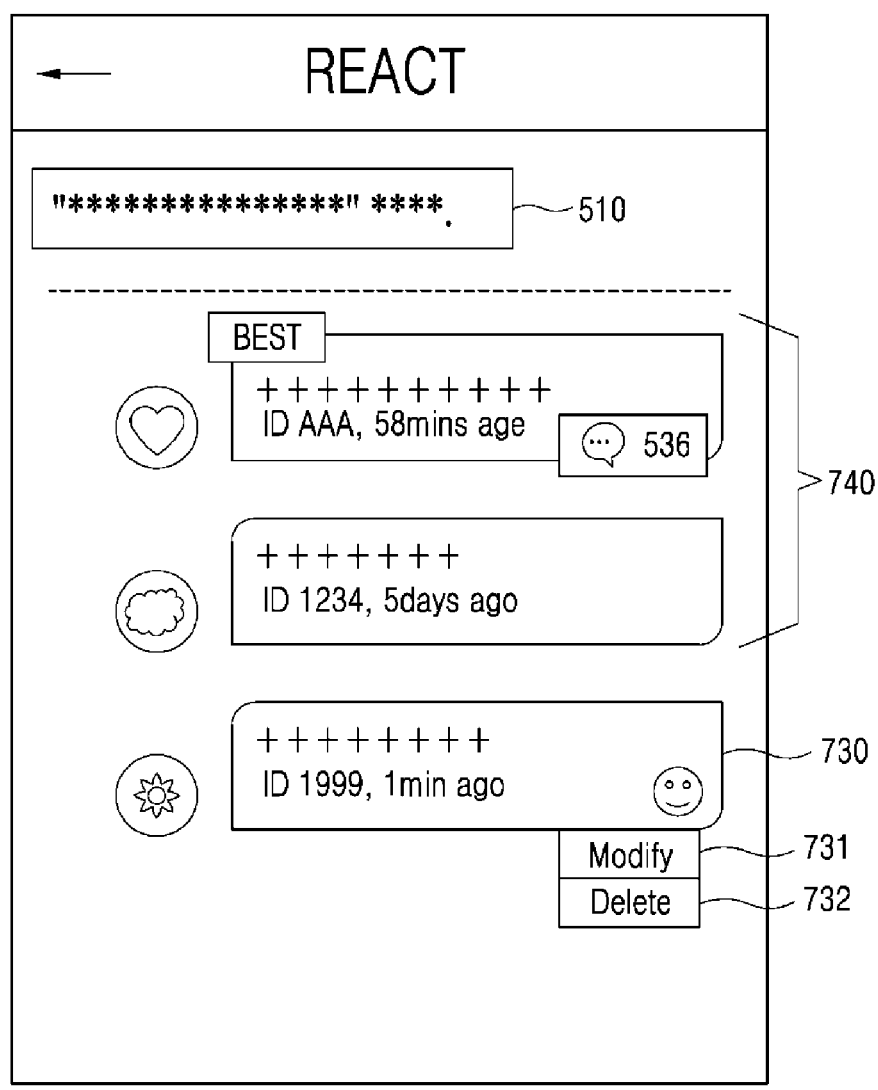

FIGS. 5 through 7 illustrate examples of a process of registering a section comment according to at least one example embodiment.

FIG. 5 illustrates a user interface screen 500 on which content is displayed. Here, the content may include a text 501 and an image 502, but the example embodiments are not limited thereto, and the content may also include audio, video, video games, etc. A user may verify the full text of the content through scrolling on the user interface screen 500.

When the user desires to post a section comment, the user may select a comment section 510 in the content displayed on the user interface screen 500. For example, the user may select a desired portion of the content, such as text or image area as the comment section 510 by performing a UI operation, such as long tapping, etc., the text 501 or the image 502 on which the user desires to post the comment. For example, in the case of the text 501, the comment register 310 may specify the comment section 510 in such a manner that the user directly designates a text section. Additionally, the comment register 310 may automatically designate, as the comment section 510, a section unit, for example in the text context, a syntactic word, a sentence, a paragraph, etc., in which a word corresponding to a location selected by the user is present based on the word. However, the example embodiments are not limited thereto, and in other contexts, such as when the content is an image, the comment register 310 may automatically designate as the comment section 510 an optically identified portion of the image (identified via machine learning based image analysis, analysis of the color values of the image, etc.) as a section unit in which a portion of the content is similar to, corresponding to, related to, and/or the same as an image portion that is selected by the user (e.g., the comment register 310 may determine whether other parts of the image have a degree of similarity to the image portion selected by the user that exceeds a desired threshold value, etc.). Additionally, in other example embodiments, the comment register 310 may automatically designate an audio based section unit, a video based section unit, a video game based section unit, etc., in a similar manner. When the comment section 510 is automatically designated, a function that allows a designation cancellation or a designation modification may be provided with respect to the designated comment section 510. The comment register 310 may display the comment section 510 selected by the user in the content to be distinguished from other portions of the content. For example, the selected comment section 510 may be highlighted in a desired color, additional UI elements may be displayed on the selected comment section 510 (e.g., a popup box, a link, etc.), a sound may be played corresponding to the playing of the selected comment section 510, haptic feedback may be provided corresponding to the selected comment section 510, etc.

In response to a user selecting the comment section 510 in the content, a comment posting user interface (UI) 511 may be activated and a comment posting screen 620 of FIG. 6 may be provided. The comment posting screen 620 may include, for example, an interface for posting a comment in a text form, an interface for posting a comment in a voice form, an interface for inputting emoji or a sticker, etc.

When the user posts a comment through the comment posting screen 620 of the comment posting UI 511, the comment register 310 may complete registration of the section comment by storing the comment of the user in association with the comment section 510 corresponding to the desired section of the content on the content server 150 (e.g., storing the user inputted comment in a comment database (not shown) corresponding to the content and/or the desired section of the content based on an identifier corresponding to the section of the content, and/or storing the user inputted comment as comment information embedded as code, such as XML or HTML code, Javascript, metadata, etc., in the file of the content itself, etc.). In response to completing the registration of the section comment, the comment register 310 may provide a section comment screen 700 of FIG. 7. Here, the section comment screen 700 may simultaneously display the comment section 510 selected by the user and a section comment 730 posted by the user on the comment section 510, and may also display a list of comments 740 registered by other users on the comment section 510 based on the previously registered section comments associated with the content using the comment database and/or the embedded comment information of the content. The section comment screen 700 may provide an editing tool including, for example, a modify menu 731 that allows modification of the registered comment, and a delete menu 732 that allows for deletion of the registered comment, etc., on the section comment 730 posted by the user. Also, the section comment screen 700 may further include a function of registering a plus-comment (e.g., a response to a comment) on any of section comments registered by other users, a function of registering a reaction, for example, Like, Dislike, Recommend, Upvote, Downvote, etc., to the previously registered comments, etc. Accordingly, in response to completing the registration of the section comment by the user, the comment register 310 may display which opinion the user has posted on which section in the content through the section comment screen 700, and may also provide comments of other users registered to the same section of the content. Accordingly, users may immediately share their opinions regarding a particular section of the content.

FIGS. 8 through 13 illustrate examples of a process of providing a section comment according to at least one example embodiment.

Figure 8:
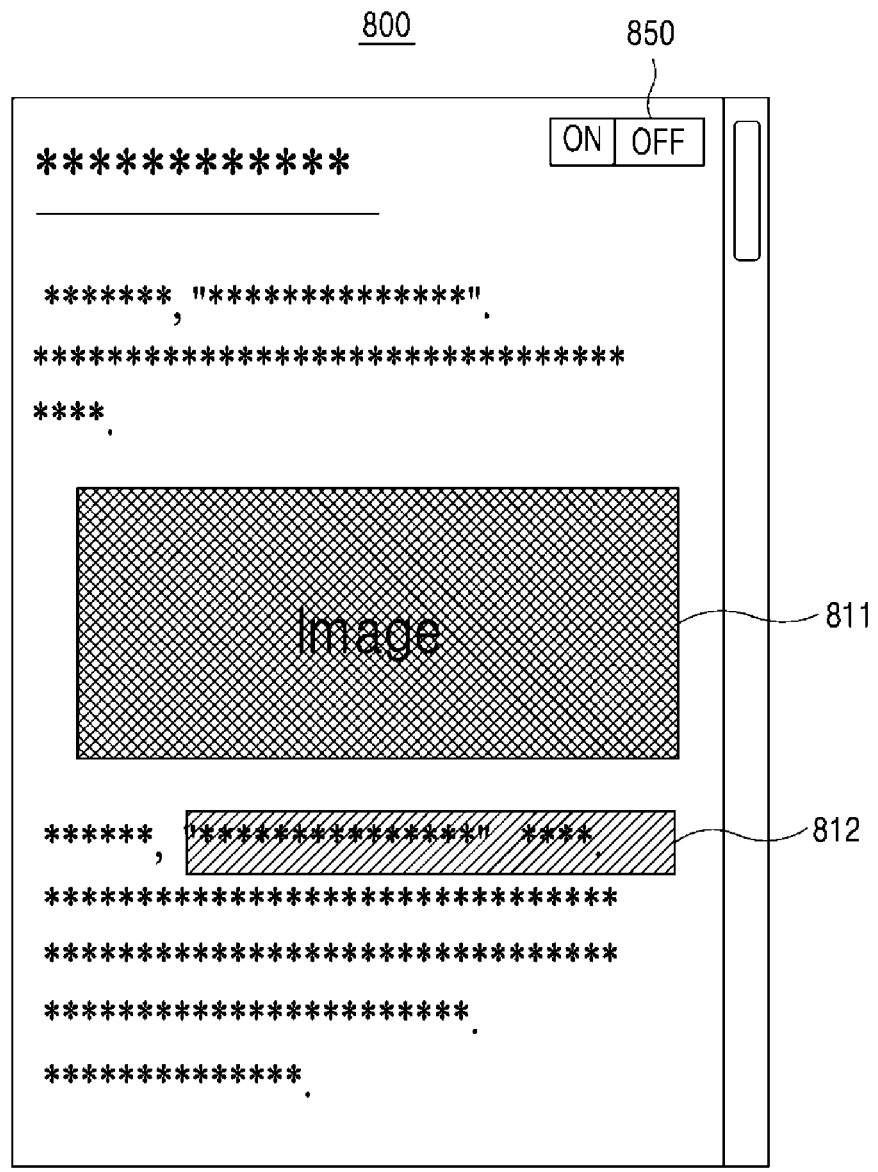
FIGS. 8 through 13 illustrate examples of a method of providing a section comment according to at least one example embodiment.
Figure 9:
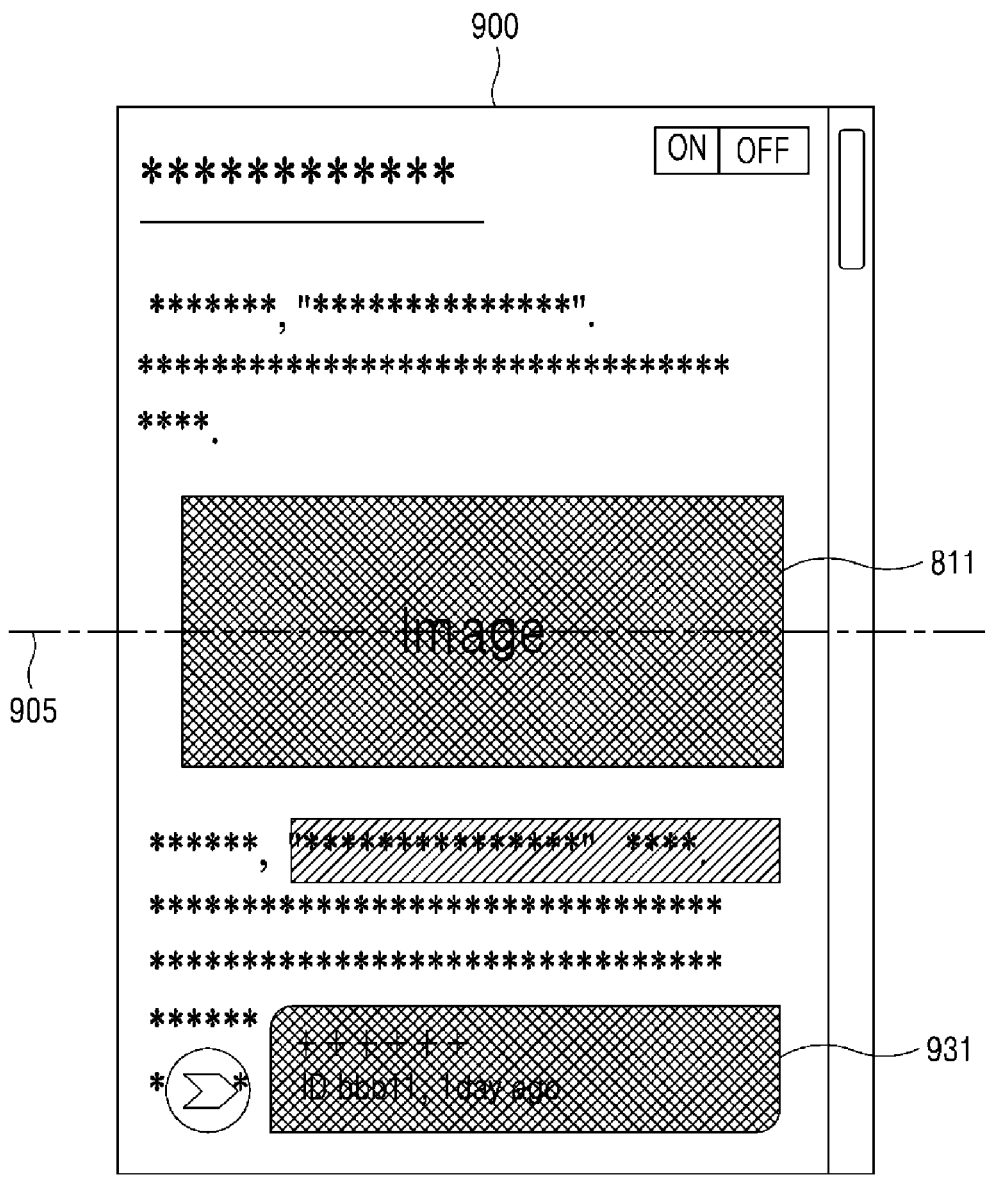

FIG. 8 illustrates an example of a user interface screen 800 on which content including a text and an image is displayed, but the example embodiments are not limited thereto. A user may verify, for example, the entire content, such as the full text of content, the full image, etc., by scrolling on the user interface screen 800.

Referring to FIG. 8, the comment provider 320 may highlight and/or display one or more comment sections, such as each of comment sections 811 and 812, to which a section comment is registered in the content. Here, for example, different highlight colors may be applied to the comment sections 811 and 812 to be distinguished from each other, respectively, but the example embodiments are not limited thereto and other forms of highlighting may be applied to different comment sections registered with the content. The user interface screen 800 may include an interface (ON/OFF) 850 that enables the user to selectively set whether to display a section comment. For example, the user interface screen 800 may display content in which a display function for a section comment is OFF as a default when providing the content to the user, and may display the section comment through scrolling on the content in response to a user request for displaying the section comment through the interface 850, that is, if the user selects ON for the display function while viewing the content. As another example, when the user initially views the content, the display function for the section comment may be OFF. When the user views the same content twice or more, the display function for the section comment may be turned ON and the section comment may be provided through scrolling on the content. The server 150 may manage a user consumption log associated with the content. Thus, the server 150 may not display the section comment when the user initially views the content, and may provide the section comment when the user views the same content. Accordingly, it is possible to not display the section comment when the content is initially provided to the user, and to display the section comment when the user requests displaying of the section comment or when the user views the same content. Additionally, once the section comment has been viewed by the user, the server 150 may update the user consumption log to indicate, for example, that the user has viewed (or not viewed) the section comment, so that the section comment is not shown to the user again in a following viewing of the content, or that the user has replied to the section comment, has voted for the section comment, has recommended the section comment, has had the section comment recommended to the user by one of the user's associated friends, etc.

The comment provider 320 may display section comments (e.g., sequentially display section comments based on the location of the section of the content that the section comment corresponds to, the timestamp of the registration of the section comment, whether the section comment is highly rated, whether the section comment is recommended to the user, display a representative section comment, etc.) through scrolling on/playing/viewing the content and may display a corresponding section comment in a layer form (e.g., display the section comment on a different layer, such as a higher layer, than the content) at a desired location of a screen area at a point in time at which a highlighted comment section is displayed on the screen area. For example, referring to FIG. 9, the comment provider 320 may display a representative comment 931 among section comments registered to the comment section 811 at a point in time at which the comment section 811 passes a reference line 905, based on the reference line 905 that is desired and/or preset on a screen area 900 of an electronic device. The reference line 905 may use, for example, a center line of the screen area 900, or may be determined based on a content characteristic or readability, but the example embodiments are not limited thereto.

Figure 10:
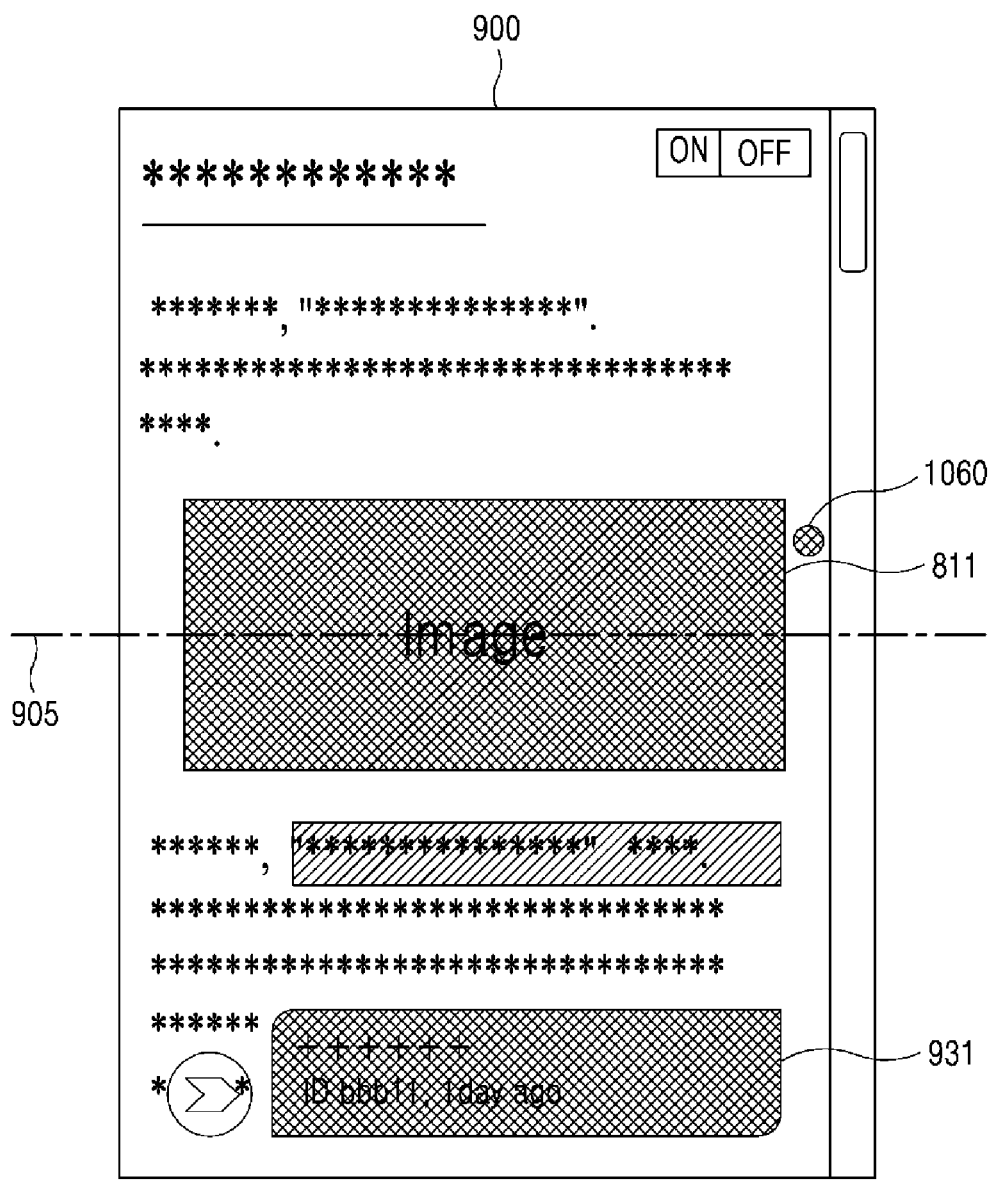

Referring to FIG. 10, a separate indicator 1060 may be additionally provided at a location adjacent to the comment section 811 to further intuitively verify a section comment to which the currently displayed representative comment 931 relates. For example, the indicator 1060 and the representative comment 931 may be set to appear, that is, be displayed at a point in time at which the comment section 811 reaches the reference line 905 of the screen area 900 and/or a desired area based on the reference 905, and to disappear at a point in time at which the comment section 811 is deviated from the reference line 905 or the desired area based on the reference line 905, but the example embodiments are not limited thereto. A layer color of the representative comment 931 and a color of the indicator 1060 may be applied based on a highlight color of the comment section 811.

Figure 11:
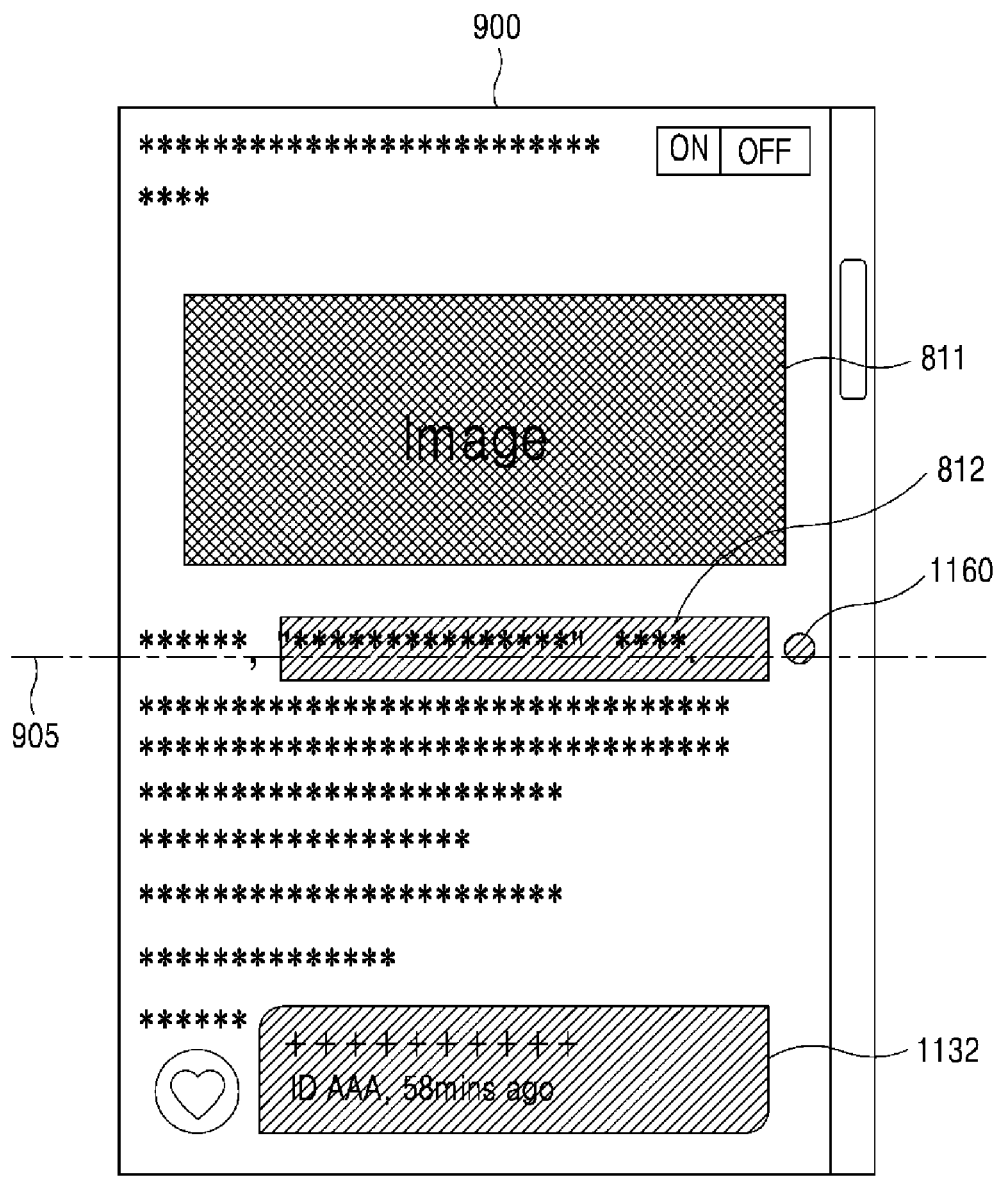
Figure 12:
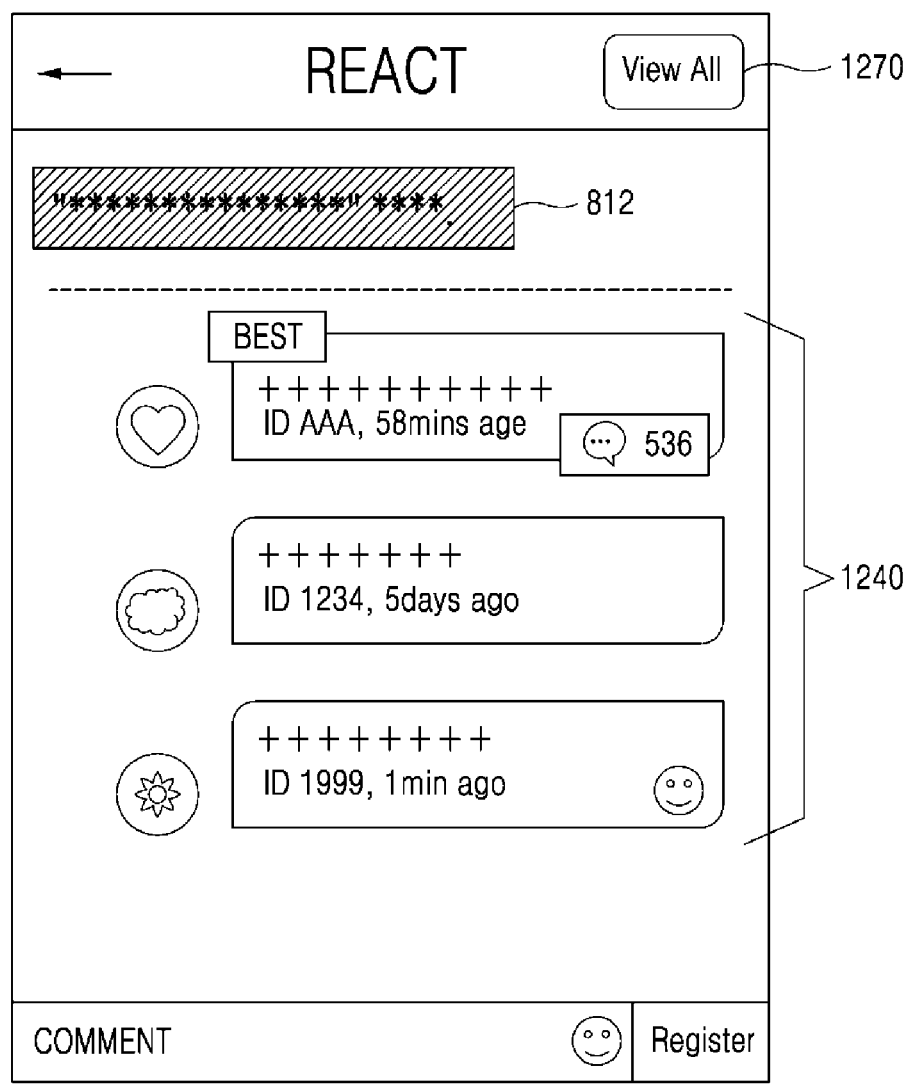

Referring to FIG. 11, when the comment section 811 is deviated from the reference line 905 of the screen area 900 and/or the desired area based on the reference line 905 through scrolling/playing/viewing on the content and the comment section 812 reaches the reference line 905 or the desired area based on the reference line 905, the comment provider 320 may, for example, display a representative comment 1132 among section comments registered to the comment section 812. Likewise, when the comment section 812 reaches the reference line 905 of the screen area 900 and/or the desired area based on the reference line 905, an indicator 1160 may be displayed at a location adjacent to the comment section 812. Here, for example, a layer color of the representative comment 1132 and a color of the indicator 1160 may be applied based on a highlight color of the comment section 812, but the example embodiments are not limited thereto.

Although a different light color is applied to each of the comment sections 811 and 812, it is provided as an example only. Any matching method for verifying a section comment that is currently displayed in a layer form may be applied. For example, a method of applying a common highlight color to comment sections and changing a highlight color of a corresponding comment section to be distinguished from other comment sections at a point in time at which the corresponding comment section reaches the reference line 905 of the screen area 900 and/or the desired area based on the reference line 905.

In response to the user selecting a desired location of a highlighted comment section and/or a layer on which a representative comment is displayed, the comment provider 320 may provide all of the section comments registered to the corresponding comment section. For example, if the user taps the comment section 812 and/or the representative comment 1132 of FIG. 11, the comment provider 320 may provide a section comment screen 1200 that includes the comment section 812 and a section comment list 1240 of comments posted by other users on the comment section 812. Here, the section comment screen 1200 provides a list of comments posted by other users on a comment section that is registered for a desired portion of the content. Through this, the section comment screen 1200 may provide a list of comments posted by users based on a unit of a comment section instead of the entire content. To register a section comment to the comment section 812, the section comment screen 1200 may include an interface for posting a comment in a text form, an interface for posting a comment in a voice and/or audio form, an interface for inputting an emoji and/or a sticker, an interface for inputting a comment in an image and/or video form, etc. Also, the section comment screen 1200 may further include the function of registering a plus-comment on a comment included in the section comment list 1240 and a function of registering a reaction, for example, Like and Recommend, etc. The section comment screen 1200 may further include a "View All" interface 1270 for redirecting to a screen on which it is possible to view all of the comments including section comments with common comments.

Figure 13:
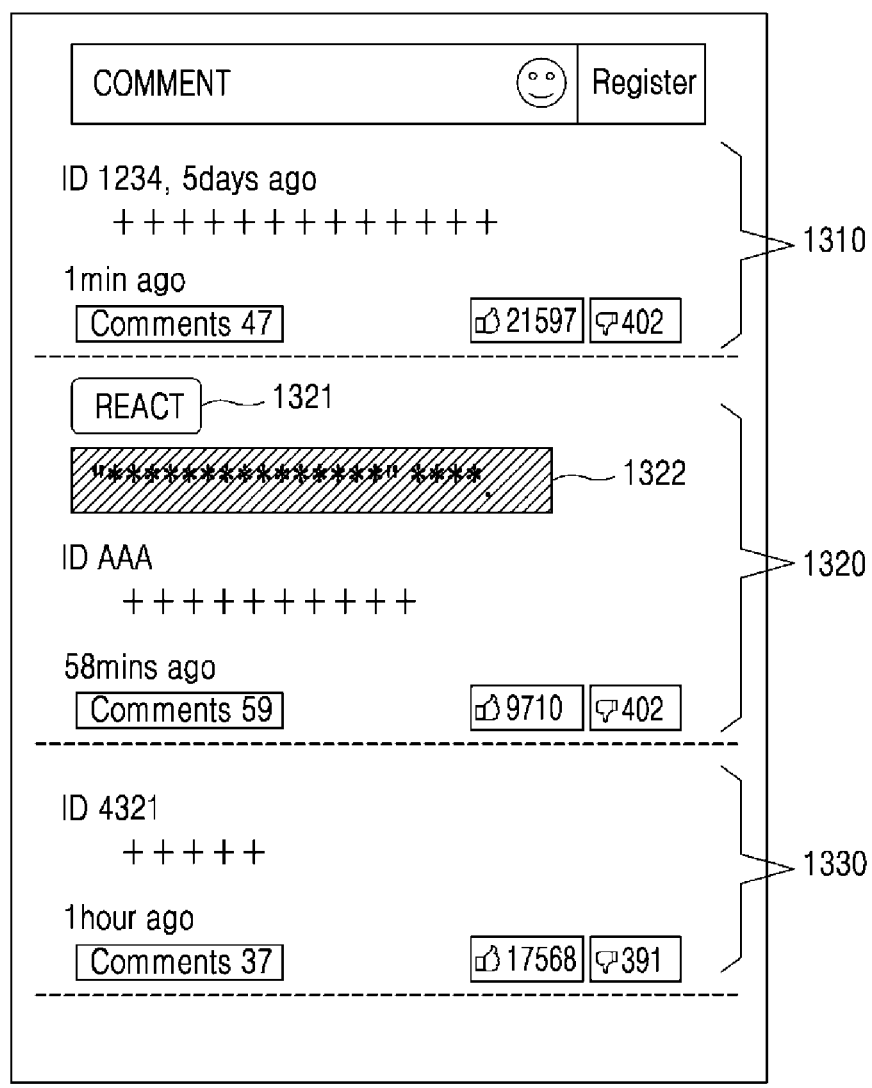

FIG. 13 illustrates an all-comment screen 1300 on which a common comment and a section comment are displayed according to at least one example embodiment.

The all-comment screen 1300 refers to a screen for verifying the entire comments registered to the entire content or a partial section of the content, and may be displayed at a lower end at which contents of the content end. The all-comment screen 1300 may be connected, for example, through scrolling on the content, viewing the content, playing the content, etc., or through the "View All" interface 1270 displayed on the section comment screen 1200 of FIG. 12.

The all-comment screen 1300 may include common comments 1310 and 1330 that are posted as comments on the entire content without specifying a section and a section comment 1320 that is posted as a comment on a specific comment section by specifying the comment section in the content. Here, a separate display element 1321 may be marked on the section comment 1320 to be distinguished from the common comments 1310 and 1330, or an effect, such as a highlight, different from the common comments 1310 and 1330 may be applied to the section comment 1320, etc. A corresponding comment section 1322 may be displayed together with the corresponding section comment 1320 to verify on which section a corresponding comment relates to. Also, an interface capable of redirecting to a main text of a corresponding section through automatic scrolling on the content may be provided in response to selecting the comment section 1322 using, for example, a double tap, etc. The all-comment screen 1300 may include an interface for posting a common comment in a text form, an interface for posting a common comment in a voice form, an interface for posting a comment in an image and/or video form, and/or an interface for inputting an emoji and/or a sticker, etc. Also, the all-comment screen 1300 may further include a function of registering a plus-comment on a comment and a function of registering a reaction, such as Like or Recommend, etc.

According to some example embodiments, a user may post a comment on a portion that the user actually sympathizes or enjoys within the content including a text and/or an image, etc., through highlighting and comment processing on a portion selected by the user in the content. Also, according to some example embodiments, it is possible to verify content and a comment simultaneously and to easily verify the context of the comment by providing a highlighted comment based on a portion displayed on a screen area during a content providing process. Consequently, the example embodiments thereby improve existing Internet commenting systems and/or online commenting systems by allowing users to specify exact portions, subsections, and/or positions of the content that they are commenting about, and allowing for viewers of the content and the posted comments to be able to immediately view both the content and the response to the content at the same time and/or side-by-side, thereby improving and amplifying the effect of the comment. Further, because the commenter may comment directly on the Internet content using the example embodiments, the commenter may reach a wider audience regarding his or her comments than is possible using pre-Internet technology.

The units and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented comment processing method comprising:
    receiving, using at least one processor, content from a server, the content including at least one of a text and an image;
    specifying, using the at least one processor, a comment section in the received content in response to a selection of a user;
    registering, using the at least one processor, a comment input by the user to the specified comment section of the content with the server, the registering including associating the input comment with the specified comment section of the content on the server;
    highlighting, using the at least one processor, the specified comment section to which the input comment is registered in the content;
    displaying, using the at least one processor, at least one registered comment among a plurality of comments registered to the highlighted section at a point in time at which the highlighted section is displayed on a screen area, the displaying including,
        selecting a representative comment from among the plurality of comments registered to each comment section of a plurality of comment sections of the content based on responses received from other users regarding the plurality of comments to each comment section, the plurality of comment sections including the specified comment section, and
        displaying the representative comment for each of the comment sections at a point in time at which the respective comment section is displayed on the screen area in response to scrolling on the content;
    transmitting, using the at least one processor, in response to the highlighted section or the displayed representative comment being selected, a list of registered comments in a section unit by providing all of the registered comments registered to the corresponding comment section; and automatically updating, using the at least one processor, log information associated with the content, the automatically updating the log information including updating information regarding comments to indicate the comments have been viewed by the user for each comment section of the plurality of comment sections of the content in response to the user viewing the respective comments, and to indicate that the user has recommended the comments or received a recommendation to the comments;

the displaying the at least one registered comment further including,
  in response to a determination that the content is initially viewed by the user based on the log information associated with the content, not displaying all of the comments, and
  in response to a determination that the content had been viewed at least once by the user based on the log information, displaying the at least one registered comment in response to the log information indicating the at least one registered comment has not been viewed by the user, and not displaying the at least one registered comment in response to the log information indicating the at least one registered comment has been previously viewed by the user.

2. The comment processing method of claim 1, wherein the displaying comprises displaying the at least one registered comment in a layer form at a desired location of the screen area.

3. The comment processing method of claim 1, wherein the displaying comprises displaying the at least one registered comment at a point in time at which the highlighted section is displayed at a reference line of the screen area or a desired area based on the reference line.

4. The comment processing method of claim 3, wherein the displaying comprises distinguishably displaying a portion of the highlighted section that reaches the reference line or the desired area, the portion of the highlighted section being distinguished from a remaining portion of the highlighted section.

5. The comment processing method of claim 3, wherein the displaying comprises displaying an indicator at a location adjacent to a portion of the highlighted section that reaches the reference line or the desired area.

6. The comment processing method of claim 3, wherein the displaying comprises:
  applying a different highlight color for each comment section registered in the content; and
  displaying each comment section of the plurality of comment sections based on a highlight color of a portion of the highlighted section that reaches the reference line or the desired area.

7. The comment processing method of claim 1, wherein the registering comprises specifying at least one section unit of the content that includes a desired word, the desired word corresponding to a location selected by the user in the content.

8. The comment processing method of claim 1, further comprising:
  transmitting, using the at least one processor, an all-comment list of comments registered to the content in response to scrolling on the content or a user request,
  wherein the transmitting the all-comment list comprises displaying comments registered to a desired partial section in the content to be distinguished from other comments among the comments included in the all-comment list.

9. The comment processing method of claim 8, wherein the transmitting the all-comment list comprises displaying section information associated with each of the comments registered to the desired partial section in the all-comment list.

10. The comment processing method of claim 1, wherein the displaying comprises:
  displaying the at least one registered comment in response to receiving a comment display request from the user, or repeatedly providing the content to the user, instead of displaying the at least one registered comment at an initial stage of providing the content to the user.

11. A non-transitory computer-readable recording medium storing computer readable instructions that, when executed by at least one processor, cause the at least one processor to:
  receive content from a server, the content including at least one of a text and an image;
  specify a comment section in the received content in response to a selection of a user;
  register a comment input by the user to the specified comment section of the content with the server, the registering including associating the input comment with the specified comment section of the content on the server;
  highlight the specified comment section to which the input comment is registered in the content;
  display at least one registered comment among a plurality of comments registered to the highlighted section at a point in time at which the highlighted section is displayed on a screen area, the displaying including,
    selecting a representative comment from among the plurality of comments registered to each comment section of a plurality of comment sections of the content based on responses received from other users regarding the plurality of comments to each comment section, the plurality of comment sections including the specified comment section, and
    displaying the representative comment for each of the comment sections at a point in time at which the comment section is displayed on the screen area in response to scrolling on the content;
  transmit, in response to the highlighted section or the displayed representative comment being selected, a list of registered comments in a section unit by providing all of the registered comments to the corresponding comment section; and
  automatically update log information associated with the content, the automatically updating the log information including updating information regarding comments to indicate the comments have been viewed by the user for each comment section of the plurality of comment sections of the content in response to the user viewing the respective comments, and to indicate that the user has recommended the comments or received a recommendation to the comments;

the displaying the at least one registered comment further including,
  in response to a determination that the content is initially viewed by the user based on the log information associated with the content, not displaying all of the comments, and
  in response to a determination that the content had been viewed at least once by the user based on the log information, displaying the at least one registered comment in response to the log information indicating the at least one registered comment has not been viewed by the user, and not displaying the at least one registered comment in response to the log information indicating the at least one registered comment has been previously viewed by the user.

12. A computer-implemented comment processing system comprising:
    at least one processor configured to execute computer-readable instructions to,
    receive content from a server, the content including at least one of a text and an image;
    specify a comment section in the received content in response to a selection of a user;
    register a comment input by the user to the specified comment section of the content with the server, the registering including associating the input comment with the specified comment section of the content on the server;
    highlight the specified comment section to which the input comment is registered in the content;
    display at least one registered comment among a plurality of comments registered to the highlighted section at a point in time at which the highlighted section is displayed on a screen area, the displaying including,
        selecting a representative comment from among the plurality of comments registered to each comment section of a plurality of comment sections of the content based on responses received from other users regarding the plurality of comments to each comment section, the plurality of comment sections including the specified comment section, and
        displaying the representative comment for each of the comment sections at a point in time at which the comment section is displayed on the screen area in response to scrolling on the content;
    transmit, in response to the highlighted section or the displayed representative comment being selected, a list of registered comments in a section unit by providing all of the registered comments to the corresponding comment section; and
    automatically update log information associated with the content, the automatically updating the log information including updating information regarding comments to indicate the comments have been viewed by the user for each comment section of the plurality of comment sections of the content in response to the user viewing the respective comments, and to indicate that the user has recommended the comments or received a recommendation to the comments;
    the displaying the at least one registered comment further including,
        in response to a determination that the content is initially viewed by the user based on the log information associated with the content, not displaying all of the comments, and
        in response to a determination that the content had been viewed at least once by the user based on the log information, displaying the at least one registered comment in response to the log information indicating the at least one registered comment has not been viewed by the user, and not displaying the at least one registered comment in response to the log information indicating the at least one registered comment has been previously viewed by the user.

13. The comment processing system of claim 12, wherein the at least one processor is further configured to display the at least one registered comment in a layer form at a desired location of the screen area.

14. The comment processing system of claim 12, wherein the at least one processor is further configured to display the at least one registered comment at a point in time at which the highlighted section is displayed at a reference line of the screen area or a desired area based on the reference line.

15. The comment processing system of claim 14, wherein the at least one processor is further configured to distinguishably display a portion of the highlighted section that reaches the reference line or the desired area, the portion of the highlighted section being distinguished from a remaining section of the highlighted section.

16. The comment processing system of claim 14, wherein the at least one processor is further configured to display an indicator at a location adjacent to a portion of the highlighted section that reaches the reference line or the desired area.

17. The comment processing system of claim 14, wherein the at least one processor is further configured to:
    apply a different highlight color for each section of the content to which a corresponding comment is registered in the content; and
    display the at least one registered comment based on a highlight color of a portion of the highlighted section that reaches the reference line or the desired area.

18. The comment processing system of claim 12, wherein the at least one processor is further configured to:
    transmit an all-comment list of comments registered to the content in response to scrolling on the content or a user request;
    display comments registered to a partial section of the content to be distinguished from other comments among the comments included in the all-comment list; and
    display section information associated with each of the comments registered to the partial section in the all-comment list.

* * * * *